Patented July 31, 1934

1,968,178

UNITED STATES PATENT OFFICE 1,968,178

ACID WOOL DYESTUFF OF THE ANTHRAQUINONE SERIES AND PROCESS OF MAKING SAME

Berthold Stein, Mannheim-on-the-Rhine, and Ernst Honold, Frankfort-on-the-Main-Fechenheim, Germany, assignors to General Aniline Works, Inc., New York, N. Y., a corporation of Delaware No Drawing. Application April 11, 1932, Serial No. 604,652. In Germany April 15, 1931

3 Claims. (Cl. 260—59)

This invention relates to acid wool dyestuffs of the anthraquinone series and to a process of making same.

The process of the invention comprises replacing either halogen atom of 1.4-diamino-2.3-dihalogen-anthraquinone by a mercapto and the latter by a sulfonic acid group, and replacing the second halogen atom by an aryloxy group and advantageously sulfonating the latter.

The following scheme of formulæ illustrates the said reactions:—

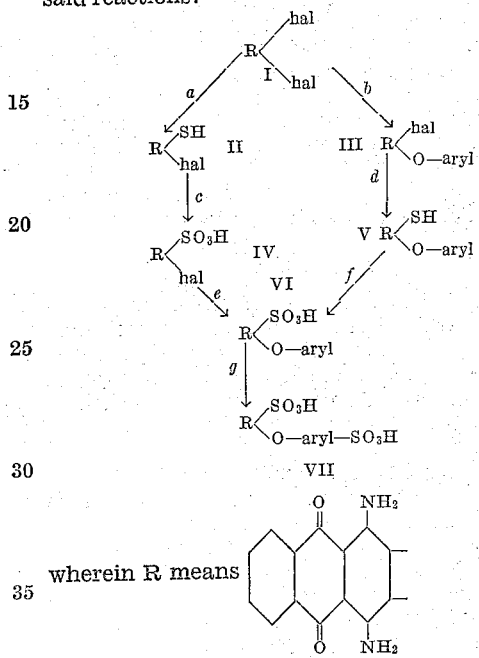

wherein R means

The introduction of the aryloxy group (steps b and e) is effected by treating the halogen compound (I or IV) with an aromatic hydroxy-compound in the presence of an acid binding agent, advantageously at the temperature of the boiling water-bath.

The introduction of the mercapto group (steps a and d) is carried out by acting on the halogen compound (I or III) with an alkali metal sulfide.

The transformation of the mercapto group or also the corresponding disulfide group into the sulfonic acid group (steps c and f), which is the most surprising step of this process, is effected by treating the mercapto compound (II or V) in an alkaline or acid medium with an oxidizing agent of the group consisting of peroxides and per-salts, such as, for example, with hydrogen- or an alkali-metal-peroxide, perborate or persulfate. In this reaction the amino groups which are known to be easily attacked by oxidizing agents remain intact.

The sulfonic acids thus obtained are valuable dyestuffs for wool and acetate silk. They exhibit good fastness and levelling power. The 1.4-diamino-3-halogen-anthraquinone-2-sulfonic acids (IV of the above formulæ) yield blue, the 1.4-diamino-3-aryloxy-anthraquinone-2-sulfonic acids (VI of the above formulæ) yield violetish blue shades. Some of the latter sulfonic acids (VI) are described in the copending U. S. application Serial No. 557,943, filed August 18, 1931.

By aftertreating (step g) the latter compound (VI) with sulfonating agents a further sulfonic acid group enters into the aryl residue whereby dyestuffs (VII) of an especially good solubility may be obtained.

In order to further illustrate our invention the following examples are given the parts being by weight and all temperatures in centigrade degrees; but it is, however, to be understood, that our invention is not limited to the particular products or reacting conditions mentioned therein:

Example 1

To a solution of 23 parts of the sodium salt of 1.4-diamino-3-chloro-anthraquinone-2-mercaptan in 1000 parts of water, 40 parts of hydrogen peroxide of 30% are added at room temperature while stirring. After a short time the shade of the solution turns from bluish violet to blue. The mass is further stirred for some hours and then the formed sulfonic acid is isolated in the form of its sodium salt by the addition of common salt.

The sodium salt of the 1.4-diamino-3-chloro-anthraquinone-2-sulfonic acid thus obtained corresponds probably to the formula:

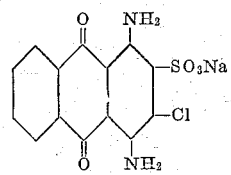

The new product is easily soluble in water with a blue color and yields a colorless solution in concentrated sulfuric acid, which becomes blue upon the addition of paraformaldehyde.

The oxidation may be carried out with the same success in the presence of free alkali.

Example 2

30 parts of 1.4-diamino-3-chloro-anthraquinone-2-mercaptain are disolved in 500 parts of concentrated sulfuric acid and oxidized at 20–30° C. by slowly adding 80 parts of potassium-persulfate. After having stirred for several hours the formed sulfonic acid is isolated in the form of the difficultly soluble sulfate by means of ice-water.

Then the mass is dissolved in hot water with the addition of sodium carbonate and common salt is added to the solution. The compound thus obtained is identical with that described in Example 1.

The reaction runs in the same manner, when instead of 1.4-diamino-3-chloro-anthraquinone-2-mercaptan a heavy metal salt (e. g. zinc-mercaptide) or the disulfide is used.

By starting from 1.4-diamino-3-bromo-anthraquinone-2-mercaptan a product of quite similar properties is obtained.

*Example 3*

A solution of 35 parts of the sodium salt of 1.4-diamino-3-chloro-anthraquinone-2-sulfonic acid (see Examples 1 and 2), 10 parts of sodium carbonate and 20 parts of phenol in 1500 parts of water is boiled for some hours under a reflux condenser, advantageously while stirring. The remaining excess of phenol is dissolved by the addition of caustic alkali lye and the formed 1.4-diamino-3-phenoxy-anthraquinone-2-sulfonic acid is separated in the form of its sodium salt by the addition of sodium chloride. The dyestuff thus obtained is identical with that described in U.S. application Serial No. 557,943, filed August 18, 1931, Example 1.

*Example 4*

In the same manner as described in Example 3 by using p-cresol a new dyestuff is obtained which yields a colorless solution in concentrated sulfuric acid; after the addition of paraformaldehyde this solution becomes blue. The dyestuff dyes wool from an acid bath fast equal navy blue shades and corresponds probably to the following formula:

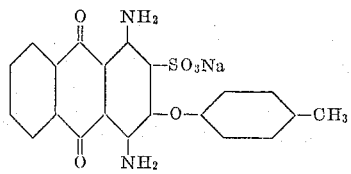

*Example 5*

By effecting the condensation according to Example 3, instead of with phenol, with the same quantity of resorcinol, a dyestuff is obtained dyeing wool bluish violet shades; it corresponds probably to the formula:

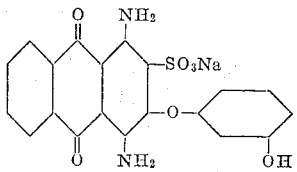

Dyestuffs dyeing similar shades are obtained, for example, by using guaiacol, m-hydroxy-benzoic acid, xylenols, etc. All these dyestuffs possess good levelling capacity.

*Example 6*

A solution of 10 parts of the sodium salt of 1.4-diamino-3-chloro-anthraquinone-2-sulfonic acid (described in Examples 1 and 2) in about 300 parts of water is condensed in the presence of 15 parts of caustic soda lye (specific gravity 1.3) with 20 parts of β-naphthol at the temperature of the boiling water-bath. The condensation product, which is separated from the solution by the addition of sodium chloride, dyes wool from an acid bath navy blue shades. The dyestuff corresponds probably to the following formula:

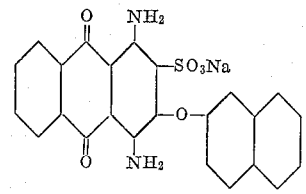

and is distinguished both by its levelling power and by its excellent fastness to perspiration and washing.

A dyestuff of similar, good properties is obtained by condensation with α-naphthol.

*Example 7*

To a solution of 38 parts of the sodium salt of 1.4-diamino-3-phenoxy-anthraquinone-2-mercaptan in 1000 parts of water, 40 parts of hydrogen peroxide (30%) are added at room temperature while stirring. After some hours stirring the formed 1.4-diamino-3-phenoxy-anthraquinone-2-sulfonic acid is separated from the bluish violet solution, which is filtered if necessary, in the form of its sodium salt by the addition of sodium chloride. The dyestuff thus obtained is identical with that of Example 3.

With the same result the oxidation may be carried out with similar oxidation agents, such as perborates or alkali-peroxides.

The sodium salt of the 1.4-diamino-3-phenoxy-anthraquinone-2-mercaptan used as starting material may be obtained in the usual manner by treating 1.4-diamino-3-phenoxy-2-halogen-anthraquinone (see U. S. Patent No. 1,038,589) in an alcoholic solution with an excess of sodium disulfide.

*Example 8*

43 parts of the sodium salt of 1.4-diamino-3-β-naphthoxy-anthraquinone-2-mercaptan (obtainable in an analogous manner to the phenoxy-derivative) are oxidized according to Example 1. The dyestuff thus formed is identical with that of Example 6.

We claim:—

1. A process which comprises treating 1.4-diamino-2-mercapto-3-halogeno-anthraquinone with an oxidizing agent of the group consisting of peroxides and per-salts and treating the 1.4-diamino-3-halogeno-anthraquinone-2-sulfonic acid thus formed with a compound of the group consisting of phenols and naphthols in the presence of an acid-binding agent.

2. A process which comprises treating 1.4-diamino-2-mercapto-3-chloro-anthraquinone with an oxidizing agent of the group consisting of peroxides and per-salts and treating the 1.4-diamino-3-chloro-anthraquinone-2-sulfonic acid thus formed with resorcinol in the presence of an acid-binding agent.

3. The acid wool dyestuff of the anthraquinone series corresponding to the formula

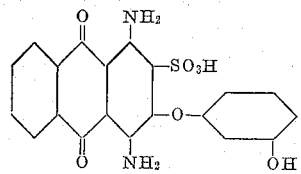

which compound dyes wool from an acid bath bluish violet shades.

BERTHOLD STEIN.
ERNST HONOLD.